United States Patent [19]
Stearns

[11] Patent Number: 4,550,742
[45] Date of Patent: Nov. 5, 1985

[54] VARIABLE TENSIONING SYSTEM FOR SHEAR SEAL VALVES

[76] Inventor: Stanley D. Stearns, 15 Pine Creek La., Houston, Tex. 77055

[21] Appl. No.: 572,746

[22] Filed: Jan. 23, 1984

[51] Int. Cl.[4] .............................................. F17D 1/16
[52] U.S. Cl. ................................ 137/14; 137/625.46; 251/175; 251/185
[58] Field of Search ............... 251/175, 180, 183, 184, 251/185; 137/625.46

[56] References Cited

U.S. PATENT DOCUMENTS

| | | | |
|---|---|---|---|
| 1,535,212 | 4/1925 | Egloff | 251/183 X |
| 1,638,152 | 8/1927 | Gabriel | 251/183 X |
| 2,792,019 | 5/1957 | Lieser | 251/175 X |
| 3,090,594 | 5/1963 | Floyd | 251/183 |
| 3,297,053 | 1/1967 | McKinney | 251/180 X |
| 3,640,310 | 2/1972 | Erlich | 137/625.46 |
| 4,328,949 | 5/1982 | Oddenino | 251/175 X |
| 4,456,028 | 6/1984 | Watson | 251/175 X |

FOREIGN PATENT DOCUMENTS 1438275 6/1976 United Kingdom ................ 251/175

*Primary Examiner*—Harold W. Weakley
*Attorney, Agent, or Firm*—Gunn, Lee & Jackson

[57] ABSTRACT

This disclosure sets forth a variable tensioning system for use in a valve featuring shear seals. In the preferred and illustrated embodiment, a spring system provides loading on the valve element to force that element into engagement with a valve seat. A sliding sealing surface is accomplished in this contact. The valve element may be a tapered plug, a sphere or a flat face or plate. Typically, it is a hard member working against a seat supporting a seal surface featuring a sliding shear seal. A specific minimum load is applied to the valve element to accomplish sealing against minimum pressure. The present apparatus incorporates a closed chamber enclosing a slideable piston. The piston has a specific cross-sectional area exposed to fluid pressure of the fluid being controlled by the valve. The piston applies pressure dependent force against the valve element. This adds to the force applied to the valve element by a spring means, the two forces controllably adding to assure that the seal is sufficiently loaded to perfect a seal up to a specified maximum pressure.

17 Claims, 8 Drawing Figures

VARIABLE TENSIONING SYSTEM FOR SHEAR SEAL VALVES

BACKGROUND OF THE DISCLOSURE

For many applications in fluid sampling and flow switching, particularly in analytical instrumentation, it is desirable to utilize a flow path as nearly uniform in cross section areas as possible. For this reason, shear seal type valves having a conical or cylindrical valve element having flat plate slider or rotor (valve element) are generally used. Such devices are well known in the art. These valve elements have ports and flow passages which are repositioned for various reasons after rotating or sliding mating sealing surfaces. Leakage is prevented by the sliding seal surfaces. Pressures encountered in some instrumental applications may exceed 5,000 psig for gases or liquids of virtually any composition. Operating temperature requirements may range from lower than −100° C. to more than 300° C.

Sliding seal surfaces, in general, may not be lubricated since lubricants may contaminate the flowing fluids. This contamination is intolerable in valves located in laboratory analytical test instruments. One important design criteria associated with such devices, however, is that leakage must not occur at the sealing surfaces; they must have spring pressure forcing the sealing surfaces together sufficiently to seal at the maximum rated pressure, even though the valve may seldom actually encounter such high pressures. This requires that, at less than maximum pressure operation, the valve is nonetheless able to operate readily at its maximum pressure loading. This results in much faster wear of the sealing surfaces than would be the case if the actual sealing force only slightly exceeded the level required to maintain a sealant at that pressure. Additionally, there are applications where a shear seal valve may be exposed to high pressure at relatively lower temperature, and must also be able to operate at elevated temperatures and lower pressures in the same analytical procedure. If a shear seal valve known in the art were operated at its maximum pressure rating and its maximum rated temperature, it would likely be damaged or its lifetime greatly reduced.

The present invention is an apparatus which overcomes these problems by using the pressure of the fluid being controlled by the valve to assist a spring in sealing the valve. This variable loading varies the force on the valve seal surfaces to improve the operating life of the sealing surface while reducing the force required for valve actuation under normal operational conditions. The apparatus dynamically permits operation, without external adjustment, with high pressure/low temperature and low pressure/high temperature fluids in the same device.

The present invention is uniquely able to handle these seal life problems. Additionally, the improved seal loading apparatus makes possible analytical procedures such as direct sampling of high pressure liquids with subsequent programming of system temperature to utilize the high boiling fraction after the sample is injected through this valve, enabling the sample pressure to be reduced.

This disclosure is directed to both a method and apparatus for controlling the sealing force acting on a shear valve. The improved valve includes a chamber with piston pressure actuated to load a shear seal multiport valve element with a mating seal. A piston applies a variable force from the fluid under control to the sealing surfaces. A spring or springs, typically Bellville washers or a coil spring, applies a nominal loading force as a required load to seal the valve at minimum pressures; the force is increased by pressure loading to a maximum rating.

The highest pressure to which the valve is exposed acts through the chamber having the moveable piston element, creating a force added to the spring force to press the valve element against the seal surfaces. The spring has an appropriate minimum force to provide loading to the seal surfaces at the minimum pressure to be encountered. The spring may hold the seal at a pressure such as 1,000 psig for a 7,000 psig maximum pressure rated valve. The additional force exerted by the flowing fluid (at up to 7,000 psi) increases as the fluid pressure increases. The increased force seals up to but not beyond a selected maximum pressure, the predetermined maximum pressure for the valve. Beyond this crossover point, the valve controllably leaks at the seal to relieve pressure to prevent damage to the seal surface and to other flow system components.

BRIEF SUMMARY OF THE DISCLOSURE

This disclosure is directed to a method and apparatus for variably loading a seal in a instrumentation valve featuring a uniform passage diameter, the apparatus further comprising a closed chamber having a piston or diaphragm therein. The piston is loaded by the fluid to be regulated in response to pressure of the fluid, thereby providing a variable load on a piston rod connected to the piston. The piston rod applies the force to the seal member, this being one of the two forces applied to the valve element causing it to seat and seal against the valve seat. The second force is provided by a fixed spring. The two forces add, thereby accommodating the load required to sustain sealing engagement between the valve element and the valve seat. Seal surfaces are fabricated of materials of different hardnesses, one being harder than the other so that sealing can be perfected.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
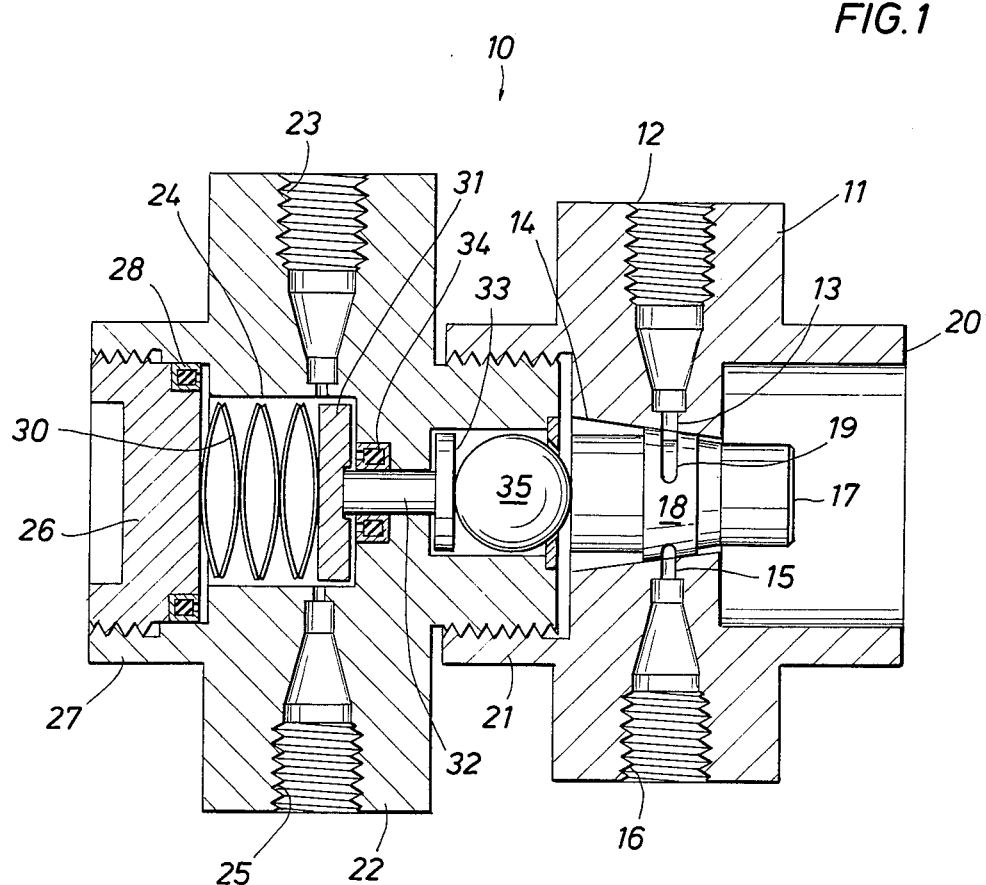
FIG. 1 is a sectional view through a valve constructed in accordance with the teachings of this disclosure incorporating a tapered plug valve element in a valve body which is loaded by a spring and which is additionally loaded by a piston in a chamber exposed to line pressure.

Attention is first directed to FIG. 1 of the drawings where the numeral 10 identifies the valve constructed in accordance with the teachings of this disclosure. The description will focus first on the valve action and thereafter will set forth the mechanism which provides variable loading on the valve. The numeral 11 identifies a valve body having an inlet port 12 which is internally threaded. It connects with an inlet valve passage 13. The passage 13 is drilled in the valve body 11. The passage 13 intercepts a tapered valve seat surface 14. The seat is the area around the port for the passage 13. In addition, there is a second passage 15 which aligns with the passage 13. This communicates with an internally threaded port 16 which is the outlet for the valve.

The numeral 17 identifies a valve element mounting stem. It is a right cylindrical structure. It supports a tapered plug 18. The plug 18 is cut on a taper, and therefore comprises a portion of a conic surface. This conic surface is grooved at 19. This provides a passage which selectively communicates the inlet with the outlet. That is, the passage 19 connects the inlet passage 13 with the outlet passage 15. The passage 19 thus is rotated to a position enabling the passage 19 to selectively flow the regulated fluids between the two radial passages 13 and 15; this flow depends on the rotational position of the valve element.

The valve stem 17 is exposed to enable a handle to be affixed to it. To this end, the valve stem is preferably provided with a connector to enable a handle to be joined to it. As an example, the valve stem 17 can be made rectangular to engage a mating socket. Another method of construction is to extend the stem 17 beyond the surrounding skirt 20, and mount a handle on it with a bolt. Many techniques can be used to position the handle for operator convenience.

The valve body includes a protruding sub 21 which is internally threaded to join to a pressure body 22. The body 22 threads to the valve body 11. It is constructed with a port 23 which serves as a pressure fluid inlet port. Fluid is introduced under pressure through the tapped port 23. That fluid flows into a chamber 24, the chamber 24 being centrally formed within the body 22. The numeral 25 identifies a similar matching outlet port. The ports 23 and 25 thus both communicate with the chamber 24. The chamber 24 is a closed chamber. It is closed by providing a threaded closure plug 26 which is received in an appropriately sized and internally threaded skirt 27. To assure sealing, a gasket ring 28 is included for the purpose of sealing the chamber 24 against leakage. The plug 26 is located to provide a specified load. That is, it is threaded to a suitable depth. The depth of the plug 26 varies the loading on a spring. In the preferred embodiment, a stack of Bellville washers 30 is captured in the chamber. The washers function as a spring system providing a fixed force. Tightening or loosening the plug adjusts the force obtained from the stack of Bellville washers. Collectively, they form a force acting on the valve element as will be described.

The spring system is captured between the plug 26 at the left and a bearing plate 31. The bearing plate 31 abuts a piston rod 32. The force of the spring is imparted to the bearing plate 31 and then to the piston rod 32. The rod 32 is limited in movement by means of an enlarged head 33. Leakage along the piston rod is prevented by a seal 34. The rod 32 imparts a loading force to sphere 35. The sphere 35 applies point loading to the valve element.

Two forces are applied to the valve element. With no fluid pressure, the plug 26 is adjusted to a fixed minimum loading. Once a particular load is obtained, the load is applied indefinitely to the valve element from the spring system. The plug 26 is originally rotated to fix the loading at a desired fixed level, thereby applying loading against the valve element. This load is graphically represented in FIG. 2 by the ordinate 40. This is the total force from the spring system. That force is the line segment 40 shown in FIG. 2 attributable solely to the spring. This is an offset or fixed bias which is added to the second force. The two forces together define the total force available for sealing purposes. The second force is graphically represented as the line 41. The slope of the line is dependent on the cross-sectional area engaged by the pressure fluid.

Figure 2:
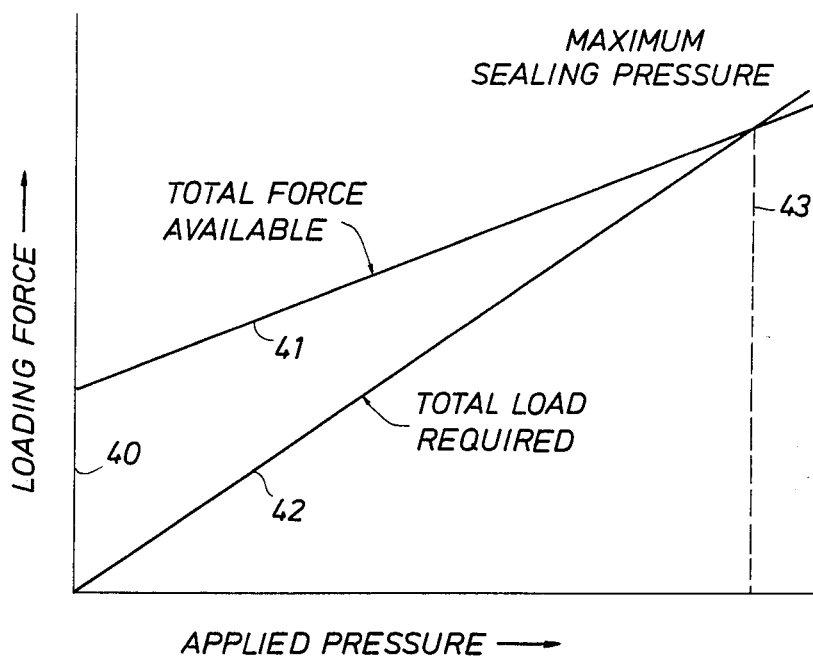
FIG. 2 is a graph of loading force versus applied pressure of the fluid to be regulated.

FIG. 2 is a graph of fluid pressure. Thus, as the pressure increases from zero, the total available force represented at 41 incrementally increases. This force is the sum of two forces, one being the fixed or constant force obtained after adjustment of the spring system 30, and the second force being obtained by the variable pressure loading.

Referring now to FIG. 1, pressure is introduced into the chamber 24. The fluid to be controlled by the valve 10 is routed through suitable plumbing (not shown) and is introduced through the port 23. It flows into the port 23 and out the port 25. The fluid is then routed to the port 12 and flows through the valve and out the port 16. Thus, the fluid to be regulated is first introduced into the chamber 24. It flows downstream to the valve for valving action. This assures that the fluid undergoing regulation is first introduced into the chamber 24, thereby increasing the loading on the valve in a manner to be described. Pressure in the chamber 24 acts on the piston rod 32. The rod has a specified cross-sectional area which is exposed to this variable pressure. A force is created which is proportional to rod diameter and pressure. This force is transferred to the right in the valve 10 toward the sphere 35 through the point loading. This in turn loads the valve element. This forces the valve element against the valve seat. Sealing is enhanced as fluid pressure loading is increased.

Ordinarily, the valve body 11 is constructed of a specified hard metal. The valve element, particularly at the tapered conic surface 18, is constructed of a softer material. For instance, one suitable material is a polymer manufactured by Dupont Chemical Company and sold under the trademark VESPEL. This polymer (with various fillers added thereto) can be fabricated into a conic surface having the appearance shown in FIG. 1 and provided with the passage 19, and functions quite well as a valve element cooperative with the mating seat. This thereby enables the two mating surfaces (one of metal and the other of a softer rigid polymer material) to seat against one another, the two surfaces thereby perfecting a seal to prevent leakage. The softer surface is dressed by sliding contact with the harder surface.

It is important to note that sealing is dependent on the pressure. As the pressure increases, a better seal is required. As the pressure incresaes, the loading on the valve element and valve seat must increase to sustain a leakproof valve.

Returning now to FIG. 2 of the drawings, the total load required is graphed at 42. This is the loading required on the valve element and valve seat to achieve leakproof seating. The total load required is variable dependent on fluid pressure. Assume as an example that the pressure is only 10% of the maximum sealing pressure. This specifies a particular point on the line 42. Sealing by the valve 10 is assured because the offset 40 provides a loading force from the spring system 30. Because the force acting on the valve element and valve seat increases, the loading exceeds the actual load required to sustain a seal. Assume that the load required to maintain a leakproof valve seal is ten (arbitrary) units. If the offset 40 is twelve units and the pressure created force is three units, then a total of fifteen units of loading is actually provided. This load far exceeds the required load to assure a seal.

As the pressure increases, the total load required also increases. The graph of FIG. 2 shows the intercept of lines 41 and 42. This point is the maximum applied pressure and the maximum sealing force. This intrecept is identified at 43. Assume that this is 5,000 psi. Assume further that the loading required to maintain a seal is twenty units. Beyond this point, any pressure exceeding this level will not have sufficient loading on the valve element to sustain a leakproof operation. The valve will then leak. This leakage desirable because it enables the device to operate at a specified maximum pressure, leaking thereabove to limit damage or harm should the valve be rotated at pressures in excess of the maximum.

The total force actually available is dependent on the slope of the line 41. This slope can be changed by increasing the diameter of the piston rod 32. If the diameter is reduced, the incremental force added by the pressure system is reduced. Conversely, if the diameter is larger, a greater force is added.

Attention is next directed to an alternate embodiment identified by the numeral 50. The embodiment 50 includes a valve body 51. Within the valve body, there is an internal chamber or cavity receiving a flat circular plate 52. The plate is the valve element. The plate is a circular planar disk. It has a groove 53 formed in one face. The groove is located so that it extends between selected ports 54, 55 and 56. Depending on the routing of the groove 53, different combinations of connections can be achieved. The valve seat is thus the opposing face of the metal head 57 which is bolted to the valve body 51. As before, the head is preferably made of metal. The valve element is made of a softer material. As an example, a softer metal can be used, or perhaps a plastic polymer such as the one mentioned above. Again, as was true with the embodiment 10, the two surfaces face one another and are machined to a very smooth and close fit. Because one is harder than the other, the softer material is dressed to seat against the mating harder material, thereby providing a valve which operates quite well and which sustains extremely high pressures.

The various ports and passages 53–56 are preferably sized to match one another. Fluid communication between them is secured by means of axial loading applied to the valve element 52. In this instance, loading is furnished by a coil spring 60. The spring 60 is shouldered against a plug 61 which threads into the body 51. The plug is adjusted in position, thereby adjusting the loading of the coil spring. This load is transferred to the valve element by the structure between the coil spring 60 and the valve element 52. A seal 62 prevents leakage along the threads and out of the recessed closed chamber which is sealed by the plug 61.

A chamber 64 is isolated by the plug 61. The coil spring 60 is in this chamber. The chamber is a fluid receiving chamber. It functions similar to the chamber 24 shown in FIG. 1. The chamber 64 is connected with two ports, one port identified at 65 and a similar and opposite port 66.

The chamber 64 is sealed by a seal 67 surrounding a piston rod 68. The rod 68 extends into the chamber 64 and supports a shoulder seated against the coil spring 60. This applies a force to a loading sphere 69. The sphere 69 imparts the force to a control disk 70. The disk 70 is joined to a radialy extending lever 73 which functions as a handle. Loading is transferred from the sphere 69 to the disk 70 to another sphere 71. That applies loading to the flat plate valve element 52. The control disk 70 utilizes a fastening pin 72 to rotate the valve element. Accordingly, the valve element is point loaded at its geometric center and yet it is also rotated by means of the rod 72 when the handle 73 is operated.

Figure 3:
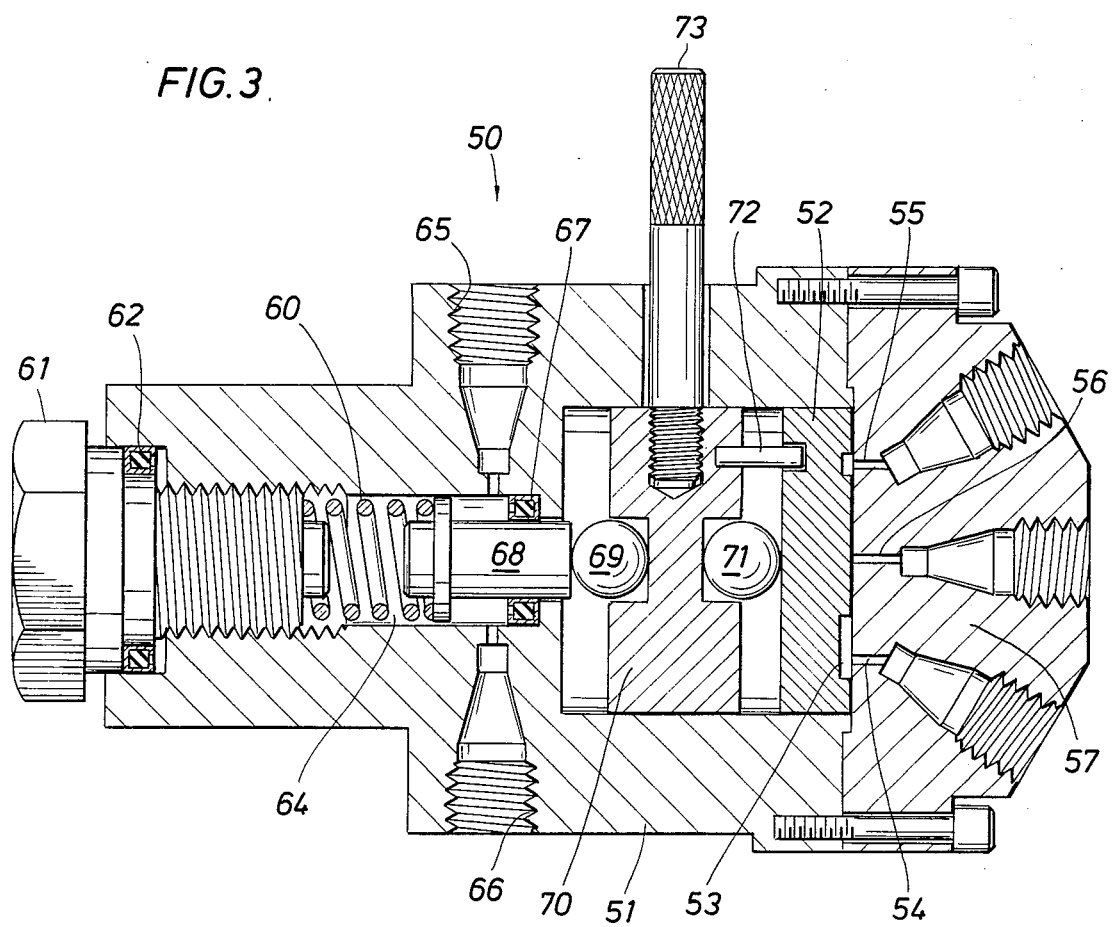
FIG. 3 is a sectional view through an alternate valve construction utilizing the apparatus of the present disclosure.

The embodiment shown in FIG. 3 applies two forces to the valve element to cause the element to seat against the valve seat. One force is a fixed force adjusted at the time of installation of the valve by adjusting the plug 61, achieving a specified loading by the coil spring 60. A second force is applied. This force is proportional to the pressure in the chamber 64 multiplied by the cross-sectional area of the piston rod 68. In this manner, it is similar to the construction shown in FIG. 1 of the drawings. The two embodiments differ in detail such as the incorporation of a coil spring as opposed to Bellville washers. Moreover, the valve elements are different in construction, one being a tapered plug and the other being a flat plate of circular configuration.

Figure 4:
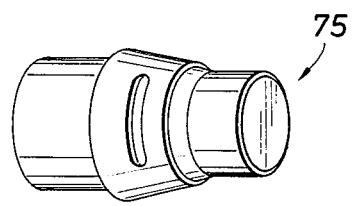
FIG. 4 is a view of the tapered valve element used in the valve of FIG. 1.
Figure 5:
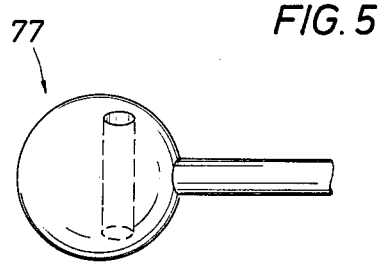
FIG. 5 is a view similar to FIG. 4 showing a spherical valve element for use in a valve.
Figure 6:
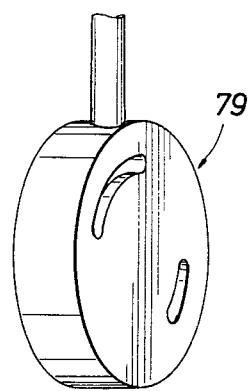
FIG. 6 shows a circular disk valve element of the type used in the valve of FIG. 3.

Attention is jointly directed to FIGS. 4, 5 and 6. A valve element is illustrated at 75 in FIG. 4. An alternate valve element is identified at 77 in FIG. 5, and a different valve element is shown at 79 in FIG. 6. These valve elements are representative of the elements which operate quite well with the present invention. So to speak, all of the valve elements are forced to the right as viewed in the drawings against a seating surface. For instance, the ball valve element 77 is preferably constructed with the passage therethrough on the right hemisphere. This enables the face to seat against a conforming valve seat face around the openings of the lateral passage through the valve element. All the valve elements shown in the drawings are adapted for use with the present invention.

Figure 7:
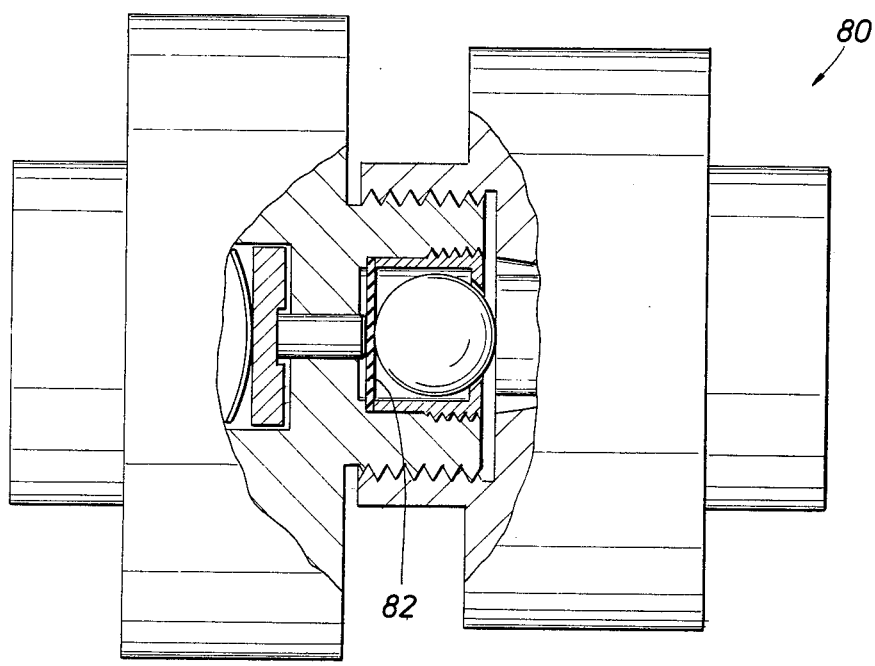
FIG. 7 is an alternate version of the structure of FIG. 1 showing an internal diaphragm construction.
Figure 8:
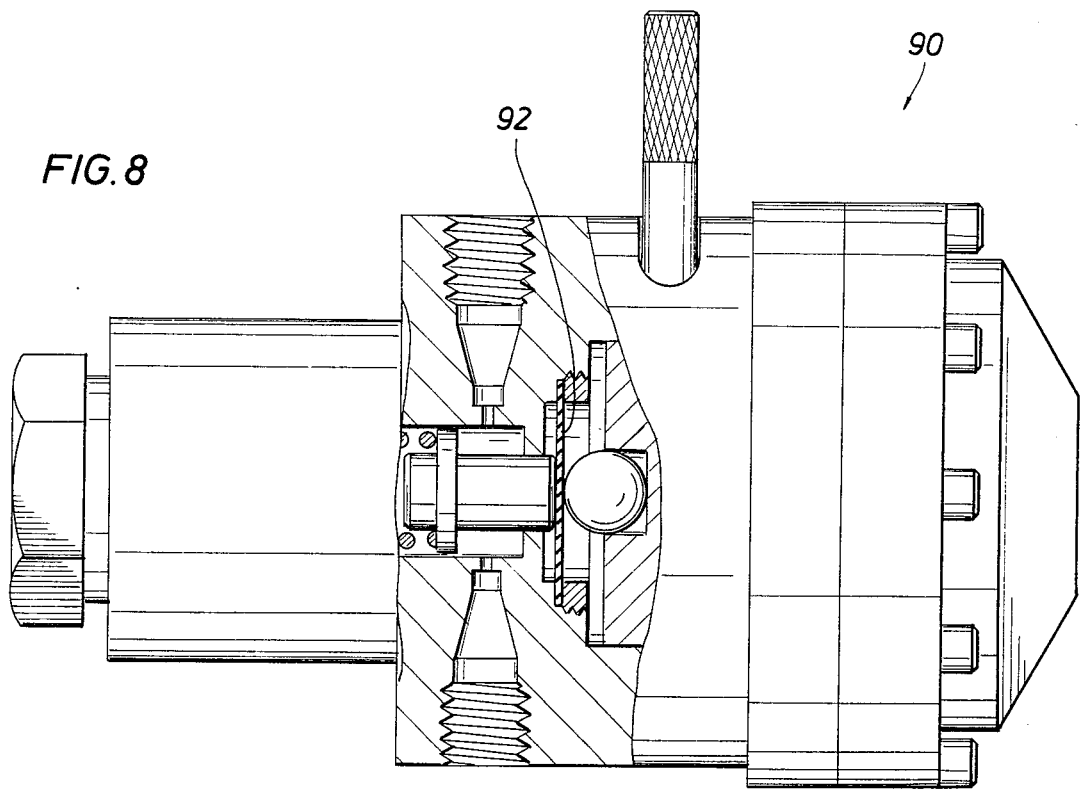
FIG. 8 is an alternate to the structure of FIG. 3.

FIGS. 7 and 8 show valves constructed in accordance with this disclosure which differ from the valves of FIGS. 1 and 3. They are sealed with diaphragms 82 and 92 in the embodiments 80 and 90, respectively. The stroke is in the range of a few thousandths of an inch, and hence, the stroke of the pressure loading means is small and readily accomodated by a diaphragm. The diaphragm construction enables a fixed seal around the periphery of the diaphragms.

In summary, this apparatus is directed to an instrumentation control valve which is particularly useful for handling variable pressure levels. It particularly works well where the pressure is subject to variation over a wide range. While the equipment can be rated for a maximum high pressure typically 5,000 psi, most of the use will be at lower pressures. Ocassionally, variations in temperature will occur. It will be understood that temperature variations cause minute dimensional changes in the components, thereby altering the size of the valve element and the valve seat. While such changes may be quite small, they are nevertheless significant in light of the fact that shear sealing surfaces are involved.

While the foregoing is directed to the preferred embodiments of the present disclosure the claims below set forth the scope of the invention.

What is claimed is:

1. An instrumentation valve comprising:
   (a) a first housing comprising a valve body having a first fluid flow passage therethrough cooperatively arranged relative to a valve seat;
   (b) a valve element adapted to be seated against said valve seat and having first and second operative positions, one position opening said first fluid flow passage through said valve body for fluid flow and the other position closing said first fluid flow passage against fluid flow, said first housing enclosing said valve element therein against said valve seat;
   (c) a second housing joined to said first housing, said second housing having a second fluid flow passage therethrough operatively connected with said first fluid flow passage;
   (d) valve element bias means providing a relatively fixed force, said bias means bearing against said valve element to relatively urge said valve element into sealing engagement with said valve seat to enable fluid flow up to a minimum pressure to flow through said first fluid flow passage and past said valve seat without leakage;
   (e) fluid pressure responsive means in said second housing cooperatively arranged relative to said second fluid flow passage including a fluid pressure receiving chamber means adapted to be connected to the source of fluid to be switched by the valve, said chamber means further including coupling means extending from said chamber means to said valve element to provide a variable force to said valve element responsive to fluid pressure in said second fluid flow passage to variably load said valve element as a function of the pressure of the fluid to be switched; and
   (f) said first and second fluid flow passages being cooperatively connected to permit fluid to flow from the source of fluid to be switched through the second fluid flow passage in said second housing and then through said first fluid flow passage in said first housing.

2. The apparatus of claim 1 wherein said fixed force is obtained from Bellville washer means.

3. The apparatus of claim 1 wherein said valve element is mounted on a stem having an axis of rotation for said stem, and further including first and second means coupling said fixed and variable forces to said stem to urge said valve element into sealing contact with said valve seat.

4. The apparatus of claim 3 wherein said chamber means encloses an elongate piston rod, said piston rod having a specified cross-sectional area exposed to the pressure of fluid in said chamber means, said piston rod further moving toward said valve element to provide a variable force to said valve element.

5. The apparatus of claim 4 including encircling seal means around said piston rod.

6. The apparatus of claim 5 including a threaded plug means engaging a matching set of threads for closing said chamber means and wherein said plug means adjusts in location to vary said fixed force.

7. The apparatus of claim 1 including a piston rod extending from said second housing and located in said chamber means to apply the variable force to said valve element.

8. The apparatus of claim 1 wherein said coupling means includes an interposed diaphragm sealed around the periphery thereof with a seal means, said seal means forming fluid isolation of said valve element.

9. The apparatus of claim 8 wherein said diaphragm includes a central deflectable portion surrounded by said seal means.

10. The apparatus of claim 9 wherein said diaphragm is fixed in location of the periphery thereof.

11. The method of loading a valve element cooperative with a valve seat to prevent leakage at the valve seat at pressures less than a selected maximum pressure, comprising the steps of:
   (a) applying a fixed force to a valve element to urge the valve element against the valve seat in leak proof cooperation; and
   (b) applying a variable force to the valve element in addition to the fixed force, the variable force being responsive to fluid pressure to be controlled by the valve element wherein the variable force applied to the valve element varies with the fluid pressure to be controlled by the valve element so that the sum of the fixed and variable force is the total force applied to the valve element and exceeds the load force applied by the fluid pressure at the valve seat for a selected maximum sealing pressure.

12. The method of claim 11 further including the step of creating the variable force by applying the fluid pressure to be switched to a closed chamber having an extendable piston rod therein wherein the cross-sectional area of the rod is sized so that, at a selected maximum pressure of the fluid, the sum of the fixed and variable forces is sufficient to prevent leakage at the valve seat, and wherein leakage at the valve seat occurs at pressures above the selected maximum pressure.

13. An instrumentation valve comprising:
   (a) a body having a first fluid flow passage therethrough, said body including an internal fluid pressure receiving chamber closed at one end by a threaded plug member threadably mounted to said body;
   (b) a valve element cooperatively arranged relative to a valve seat adapted to be seated against said valve seat, said valve element having first and second operative positions, one position opening a second passage through said body for fluid flow and the other position closing said second passage against fluid flow;
   (c) valve element bias means mounted within said pressure receiving chamber providing a relatively fixed force, said bias means bearing against said valve element to relatively urge said valve element into sealing engagement with said valve seat to enable fluid flow up to a minimum pressure to flow through said second passage past said valve seat without leakage; and
   (d) said fluid pressure receiving chamber adapted to be connected to a source of fluid to be switched by the valve, said pressure receiving chamber further including coupling means extending from said pressure receiving chamber to said valve element to provide a variable force to said valve element responsive to fluid pressure in said first fluid flow passage to variably load said valve element as a function of the pressure of the fluid to be switched.

14. The apparatus of claim 13 wherein said coupling means comprises an elongate piston rod, said piston rod having a specified cross-sectional area exposed to the pressure of fluid in said pressure receiving chamber, said piston rod further moving toward said valve element to provide a variable force to said valve element.

15. The apparatus of claim 14 wherein said plug member adjusts in location to vary said fixed force.

16. The apparatus of claim 13 wherein said fixed force is obtained from coil spring means.

17. The apparatus of claim 14 further including an enlargement at the end of said piston rod, said enlargement providing a seat for spring means acting thereagainst to provide the fixed force.

* * * * *